US010853113B2

United States Patent
Butcher et al.

(10) Patent No.: US 10,853,113 B2
(45) Date of Patent: Dec. 1, 2020

(54) HIERARCHICALLY NESTED VIRTUALIZED FUNCTIONS HAVING A PHYSICAL FUNCTION PROVIDING PROCESSING REQUESTS AND RESPONSES TO EACH LEVEL OF THE HIERARCHY

(71) Applicant: Dell Products L.P., Round Rock, TX (US)

(72) Inventors: Wade Andrew Butcher, Cedar Park, TX (US); Lee E. Ballard, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 15/616,753

(22) Filed: Jun. 7, 2017

(65) Prior Publication Data

US 2018/0357091 A1  Dec. 13, 2018

(51) Int. Cl.
  *G06F 9/455* (2018.01)
  *G06F 9/46* (2006.01)
  *G06F 9/4401* (2018.01)

(52) U.S. Cl.
  CPC ............ *G06F 9/45558* (2013.01); *G06F 9/46* (2013.01); *G06F 9/4411* (2013.01); *G06F 2009/45566* (2013.01); *G06F 2009/45579* (2013.01)

(58) Field of Classification Search
  CPC ...... G06F 9/45558; G06F 9/46; G06F 9/4411; G06F 2009/45579; G06F 2009/45566
  See application file for complete search history.

(56) References Cited

U.S. PATENT DOCUMENTS

| 7,010,622 | B1 * | 3/2006 | Bauer | ................. H04L 41/0233 370/395.31 |
| 8,453,145 | B1 * | 5/2013 | Naik | ................... G06F 9/45558 718/1 |
| 8,819,647 | B2 * | 8/2014 | Mitran | ................ G06F 9/45504 717/136 |

(Continued)

OTHER PUBLICATIONS

Intel Corporation, "Arria 10 Avalon-St Interface with SR-IOV PCIe Solutions User Guide." UG-01161, Oct. 31, 2016; 132 pages. Oct. 31, 2016.

(Continued)

*Primary Examiner* — Meng Ai T An
*Assistant Examiner* — Michael W Ayers
(74) *Attorney, Agent, or Firm* — Baker Botts L.L.P.

(57) ABSTRACT

In one or more embodiments, a device may include and/or implement a physical function and multiple virtual functions that are operable to be arranged in a logical nested hierarchy and operable to be configured to respective virtual machines in a hierarchy of nested virtual machines. For example, the physical function may be configured to receive a request, issued from a virtual function of the multiple virtual functions corresponding to a Nth level of nesting of the multiple virtual functions. Until a response to the request is received, the physical function may iteratively provide the request to a virtual function of the multiple virtual functions corresponding to a current level of nesting and if the response to the request is not received from the virtual function corresponding to the current level of nesting, utilize the current level of nesting as a level immediately below the current level of nesting.

12 Claims, 10 Drawing Sheets

(56) References Cited

U.S. PATENT DOCUMENTS

| | | | | |
|---|---|---|---|---|
| 8,825,710 | B2* | 9/2014 | Gillen | G06F 9/5072 707/638 |
| 9,672,122 | B1* | 6/2017 | Gandhi | G06F 11/1438 |
| 2012/0179844 | A1* | 7/2012 | Brownlow | G06F 9/5077 710/14 |
| 2013/0263120 | A1* | 10/2013 | Patil | G06F 9/45558 718/1 |
| 2014/0019968 | A1* | 1/2014 | Deng | G06F 9/45558 718/1 |
| 2015/0178110 | A1* | 6/2015 | Li | G06F 9/45558 718/1 |
| 2016/0098285 | A1* | 4/2016 | Davis | G06F 9/45545 718/1 |

OTHER PUBLICATIONS

Red Hat, Inc. "Guest Virtual Machine Device Configuration." Chapter 9, Retrieved from <https://access.redhat.com/documentation/en-US/Red_Hat_Enterprise_Linux/html/Virtualization_Administration_Guide/chap-Guest_virtual_machine_device_configuration.html>; 8 pages. 2017.

"HVX: High Performance Nested Virtualization." Retrieved from <https://www.ravellosystems.com/technology/nested-virtualization>; 5 pages. 2017.

Intel Corporation, "Intel Ethernet Controller 710 Series Datasheet." Networking Division, Jun. 2013; 1640 pages. Jun. 2013.

Deacon, Will. "Exposing a Virtual Iommu Interface to KVM Guests." Linux Plumbers IOMMU Microconference. Oct. 2014; 6 pages. Oct. 2014.

"I40E/IXGBE/IGB Virtual Function Driver." Retrieved from <http://dpdk.org/doc/guides-16.04/nics/intel_vf.html>, Retrieved on Sep. 15, 2017; 1 page. Sep. 15, 2017.

Zhai, Edwin, Gregory D. Cummings, and Yaozu Dong. "Live migration with pass-through device for Linux VM." OLS'08: The 2008 Ottawa Linux Symposium. 2008; 8 pages. 2008.

Intel Corporation, "Intel Virtualization Technology for Directed I/O." Architecture Specification, Jun. 2016; 276 pages. Jun. 2016.

Kofman, Ronen. "Nested Virtualization in OpenStack—Part 1." Stratosphere, Retrieved from <http://www.stratoscale.com/blog/openstack/nested-virtualization-openstack-part-1/>, Jun. 21, 2016; 10 pages. Jun. 21, 2016.

Nakajima, Jun. "Making Nested Virtualization Real by Using Hardware Virtualization Features." Intel Corporation, May 28, 2013; 19 pages. May 28, 2013.

Das, Bandan et al. "Nested Virtualization." State of the Art and future directions, Retrieved from <http://www.linux-kvm.org/images/3/33/02x03-NestedVirtualization.pdf>; 29 pages. 2017.

"Nested Virtualization" Retrieved from <https://access.redhat.com/documentation/en-US/Red_Hat_Enterprise_Linux/7-Beta/html/Virtualization_Deployment_and_Administration_Guide/Nested_Virt.html> Retrieved on Sep. 15, 2017; 2 pages.

* cited by examiner

| Physical Function Configuration Space Registers 510 | Supervisory Function Configuration Space Registers 520 | Virtual Function Configuration Space Registers 530 |

- ARI Enable
- Supported Page Size
- Global Status
- Link Control

- Allocated virtual function range

- MAC address
- BARs

FIG. 5

HIERARCHICALLY NESTED VIRTUALIZED FUNCTIONS HAVING A PHYSICAL FUNCTION PROVIDING PROCESSING REQUESTS AND RESPONSES TO EACH LEVEL OF THE HIERARCHY

BACKGROUND

Field of the Disclosure

This disclosure relates generally to information handling systems and more particularly to nested virtualization.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. In the past, a common way of achieving improved performance in a virtualized environment is the usage of SR-IOV (Single Root I/O Virtualization) and assigning virtual functions directly to virtual machines, bypassing a hypervisor. For example, in the case of network adapters, bypassing an associated virtual switch.

SUMMARY

In one or more embodiments, a device may include and/or implement a physical function and multiple virtual functions that are operable to be arranged in a logical nested hierarchy and operable to be configured to respective virtual machines in a hierarchy of nested virtual machines. For example, the physical function may be configured to receive a request, issued from a virtual function of the multiple virtual functions corresponding to a Nth level of nesting of the multiple virtual functions. In one instance, until a response to the request is received, the physical function may iteratively provide the request to a virtual function of the multiple virtual functions corresponding to a current level of nesting, the current level initially as a level immediately below the Nth level of nesting and if the response to the request is not received from the virtual function corresponding to the current level of nesting, utilize the current level of nesting as a level immediately below the current level of nesting. In another instance, after the response to the request is received and until the response is provided to the virtual function corresponding to the Nth level of nesting, the physical function may iteratively provide the response to a virtual function of the multiple virtual functions corresponding to the current level of nesting, the current level initially as a level immediately above the physical function and if the response is not provided to the virtual function corresponding to the Nth level of nesting, utilize the current level of nesting as a level immediately above the current level of nesting. In one or more embodiments, at least one virtual function of the multiple virtual functions may be a supervisory function and a child of another supervisory function of the multiple virtual functions. For example, the at least one virtual function which may be the supervisory function and the child of the other supervisory function may be configured to provide the response that grants or denies the request. In one or more embodiments, the device may be or include one or more of a single-root input/output virtualization (SR-IOV) device a network adapter, a storage adapter, and a graphics processing unit (GPU) device, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 5 illustrates an exemplary block diagram of registers, according to one or more embodiments;

DETAILED DESCRIPTION

Figure 1:
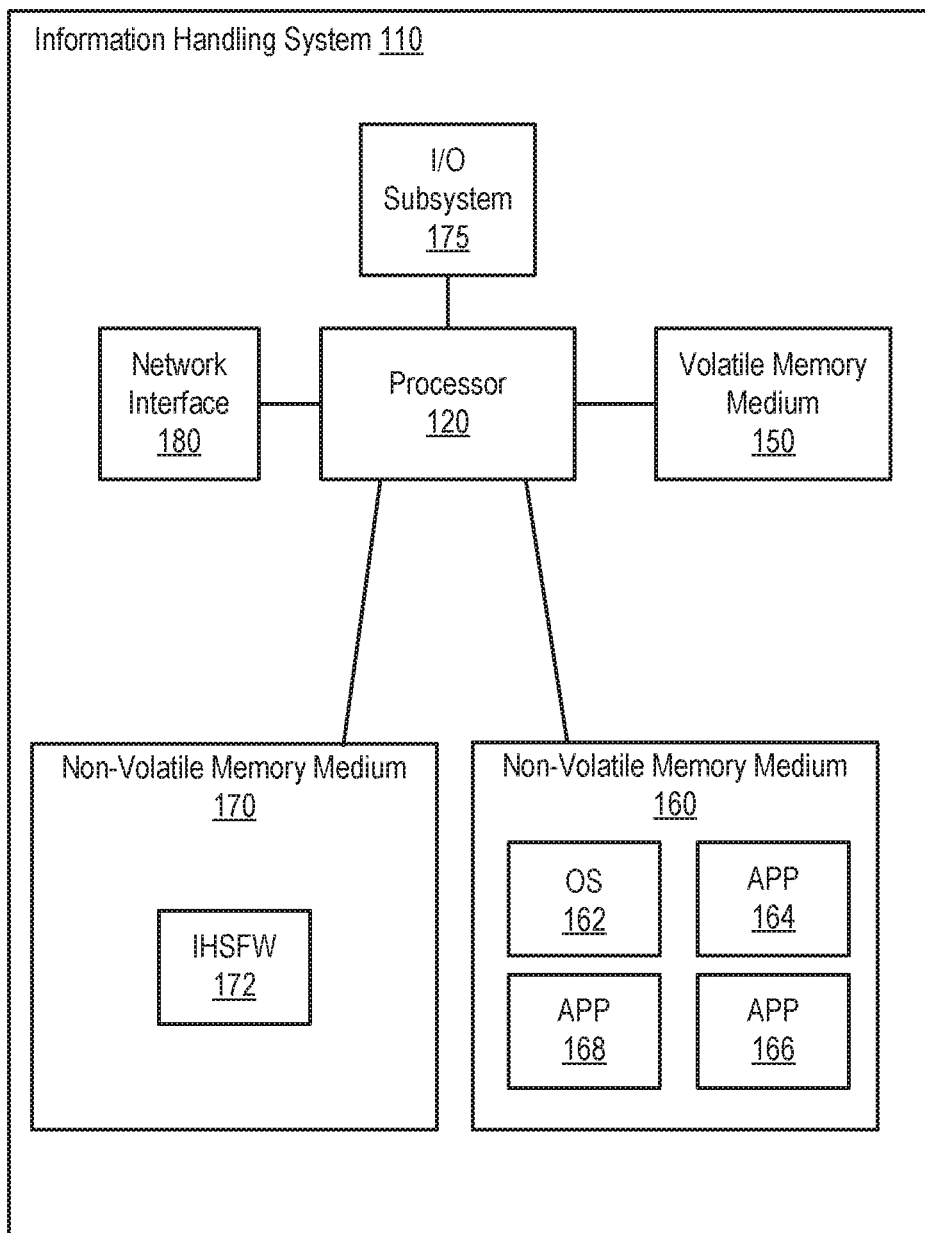
FIG. 1 illustrates an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, platform virtualization may include virtualizing one or more of a processor, a network interface, a storage interface, a storage device, and a memory, among others. In one example, a hypervisor may emulate one or more devices. For instance, guest operating systems may share one or more of a storage device via a virtual storage devices (e.g., virtual disks) and a network adapter via virtual network adapters, among others. In another example, a hypervisor may include one or more physical drivers. For instance, a guest operating system may include a hypervisor-aware driver that works with the hypervisor drivers, which may be referred to as paravirtualization.

In one or more embodiments, device emulation may utilize device interfaces in a hypervisor in providing a guest operating system with a virtual interface to hardware. For example, the virtual interface may include an expected interface, such as a virtual address space that represents a virtual device and virtual interrupt. In one or more embodiments, paravirtualization may provide an application programming interface (API) to a guest operating system. For example, a paravirtualized network adapter that provides a packet interface may be provided to the guest operating system.

In one or more embodiments, one or more hypervisors may be nested. In one example, a first hypervisor may be a bare-metal hypervisor that executes via an information handling system, and a virtual machine (VM) of the first hypervisor may execute a second hypervisor. In another example, a VM of the second hypervisor may execute third hypervisor.

In one or more embodiments, an information handling system may include and/or be coupled to a device that is a single-root input/output virtualization (SR-IOV) device. For example, the SR-IOV device may include a physical function and multiple virtual functions that may be assigned and utilized by virtual machines (VMs) that execute on the information handling system. For instance, the virtual functions may be assigned to the nested hypervisors.

In one or more embodiments, two or more of the virtual functions may be arranged in a hierarchy of the nesting of the hypervisors. For example, two of the virtual functions may be include a parent-child relationship. For instance, multiple of the virtual functions may include a descendant relationship. In one or more embodiments, a parent virtual function may control a child virtual function, and a grandparent virtual function of the child virtual function may control the parent virtual function and the child virtual function. For example, a nested virtual function may be controlled by an ancestor virtual function. For instance, each ancestor virtual function of the nested virtual function may include one or more rules for a descendant virtual function.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
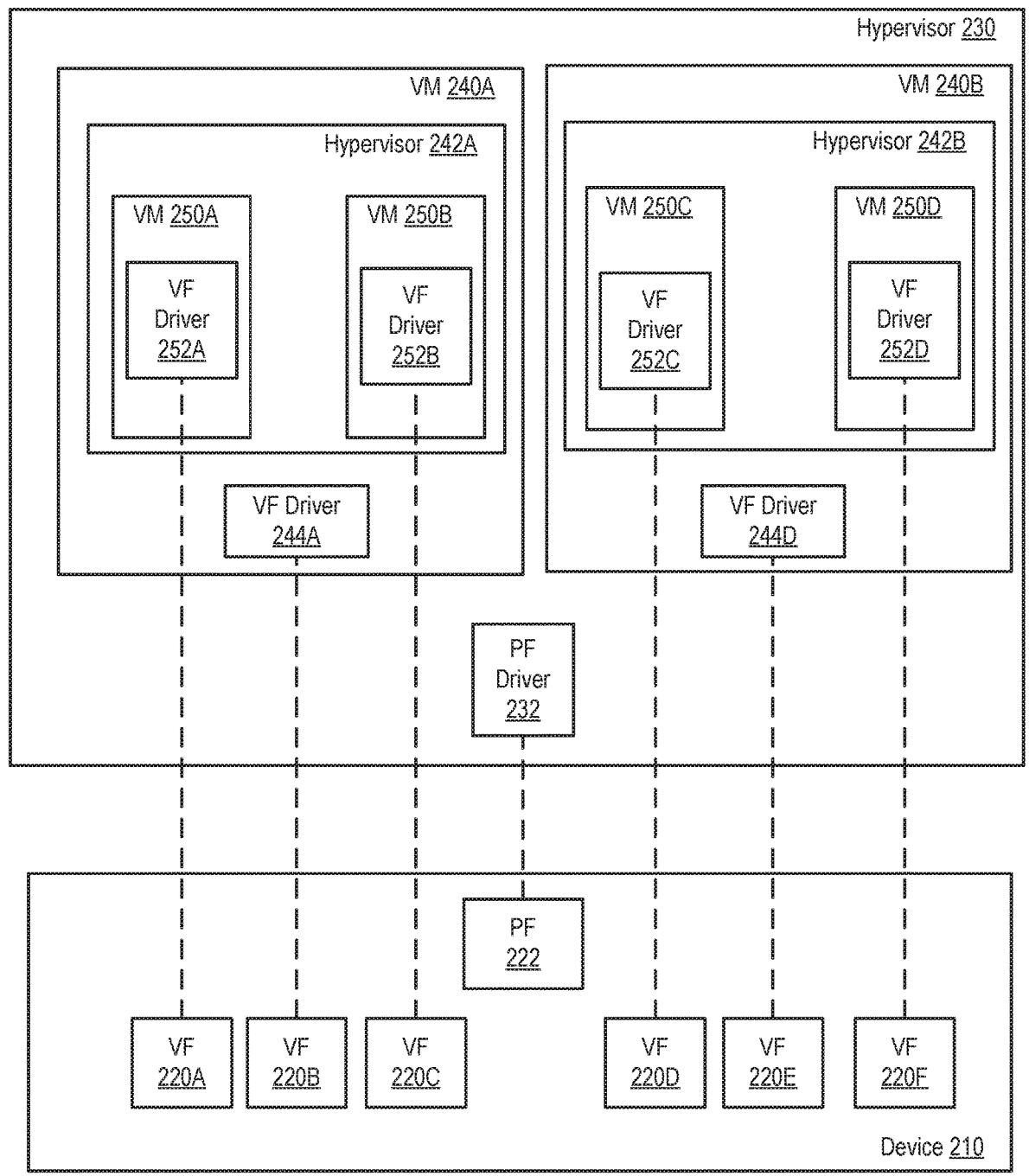
FIG. 2A illustrates exemplary virtual machines and hypervisors, according to one or more embodiments.

Turning now to FIG. 2A, exemplary virtual machines and hypervisors are illustrated, according to one or more embodiments. As shown, a device 210 may include virtual functions (VFs) 220A-220F and a physical function (PF) 222. For example, device 210 may be or include a SR-IOV device. In one instance, IHS 110 may include device 210. In another instance, device 210 may be external and coupled to IHS 110. In one or more embodiments, device 210 may be a PCIe device and may be coupled to one or more of a PCIe switch and a PCIe root complex, among others, of IHS 110. In one or more embodiments, device 210 may be configured to and/or operable to implement one or more systems, flowcharts, methods, and/or processes described herein In one or more embodiments, IHS 110 may include and/or execute a hypervisor 230. For example, hypervisor 230 may be or include a virtual machine monitor (VMM). For instance, hypervisor 230 may be utilized in running one or more virtual machine via IHS 110.

As illustrated, hypervisor 230 may include a physical function (PF) driver 232. In one or more embodiments, PF driver 232 may be utilized in managing a PF 222 of device 210. For example, PF 222 may include a SR-IOV capability structure and may be utilized in managing manage one or more SR-IOV functionalities. For instance, the one or more SR-IOV functionalities may include one or more of enabling virtualization, exposing one or more VFs 220, hiding one or more VFs 220, configuring one or more VFs 220, among others.

In one or more embodiments, hypervisor 230 may enable execution of one or more VMs 240A and 240B. For example, a VM may provide functionality of a physical computer (e.g., IHS 110). In one instance, a VM may be or include a system VM (e.g., a fully virtualized VM) that may provide a suitable substituted for a real IHS, as the system VM may provide one or more functionalities utilized in executing an entire OS. In another instance, a hypervisor may utilize native execution in sharing and managing one or more hardware resources, which may permit multiple computing environments to be isolated from one another and exist via a single IHS.

In one or more embodiments, hypervisors may be nested. As shown, VMs 240A and 240B may include respective hypervisors 242A and 242B. For example, VMs 240A and 240B may execute respective hypervisors 242A and 242B. As illustrated, hypervisor 242A may include VMs 250A and 250B, and hypervisor 242B may include VMs 250C and 250D.

As shown, hypervisors 242A and 242B may include VF drivers 244A and 244B, respectively. For example, VF drivers 244A and 244B may be utilized by respective hypervisors 242A and 242B to interface with respective VFs 220B and 220E. As illustrated, VMs 250A-250D may include VF drivers 252A-252D, respectively. For example, VF drivers 252A-252D may be utilized by respective VMs 250A-250D to interface with respective VFs 220A, 220C, 220D, and 220F.

In one or more embodiments, one or more of memory media 150 and 160 may store one or more of hypervisors 230, 242A, and 242*b*, and VMs 240A, 240B, 250A-250D. For example, one or more of memory media 150 and 160 may store one or more of hypervisors 230, 242A, and 242*b*, and VMs 240A, 240B, 250A-250D as instructions executable by processor 120.

Figure 2B:
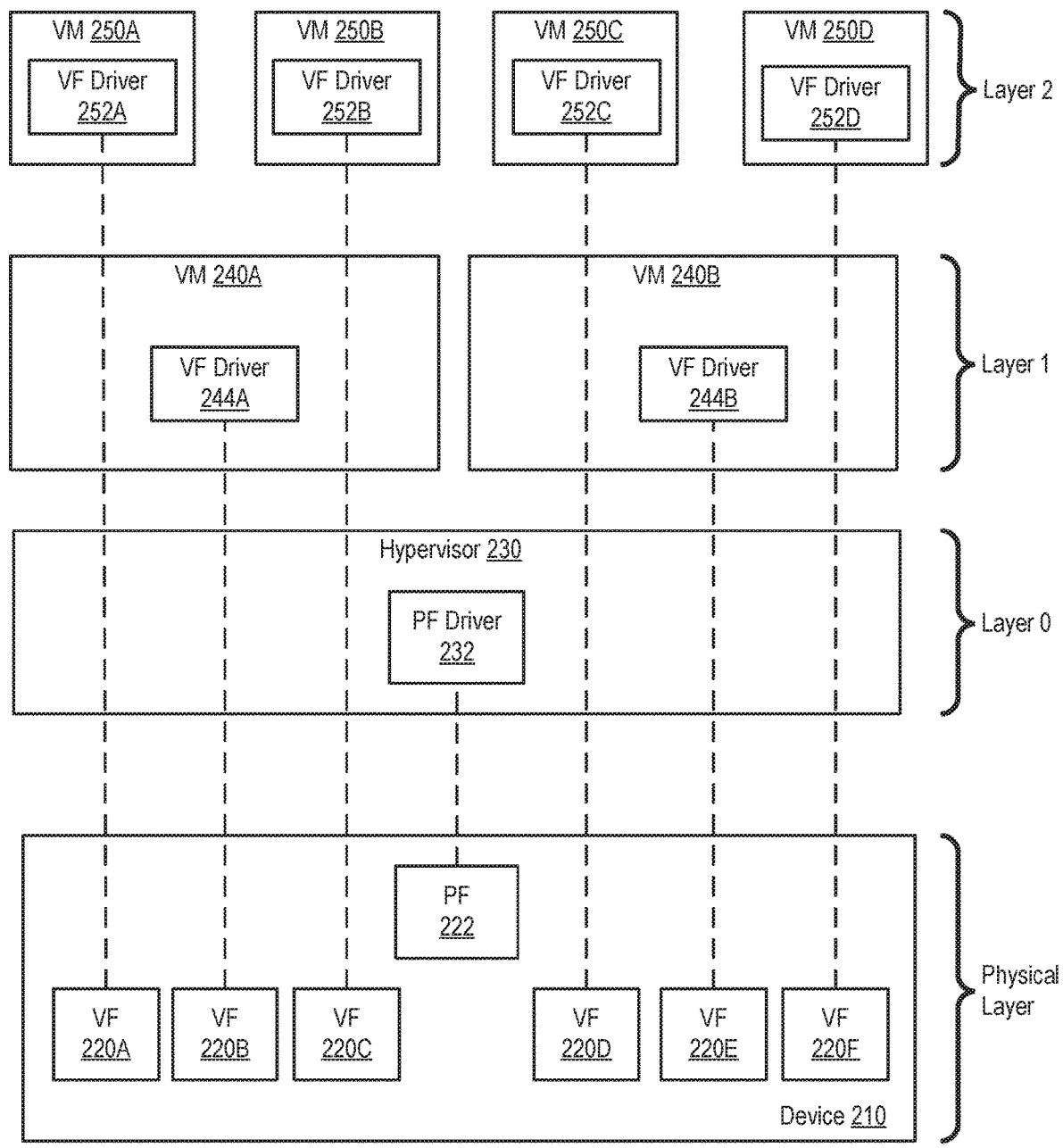
FIG. 2B illustrates exemplary virtual machines and hypervisors in a stack of virtual layers, according to one or more embodiments.

Turning now to FIG. 2B, exemplary virtual machines and hypervisors in a stack of virtual layers are illustrated, according to one or more embodiments. As shown, the nesting of VFs and VMs illustrated in FIG. 2A may be unrolled into a stack of layers, according to one or more embodiments. As illustrated, hypervisor 230 and PF driver 232 may be included in a layer 0. As shown, VMs 240A and 240B and VF drivers 244A and 244B may be included in a layer 1. As illustrated, VMs 250A-250D and VF drivers 252A-252D may be included in a layer 2. As shown, a physical layer may include PF 222 and VFs 220A-220F.

In one or more embodiments, a first virtual function may be a supervisory function of a second virtual function. For example, a supervisory function of a virtual function may be a first virtual function corresponding to a first VF driver immediately below second VF that corresponds to the virtual function. In one instance, VF 220B may be a supervisory function to VF 220A, as VF driver 244A is included in the second virtual layer (e.g., Layer 1) of the stack and VF driver 252A is included in the third virtual layer (e.g., Layer 2) of the stack. In a second instance, VF 220B may be a supervisory function to VF 220C, as VF driver 244A is included in Layer 1 of the stack and VF driver 252B is included in Layer 2 of the stack. In a third instance, VF 220E may be a supervisory function to VF 220D, as VF driver 244B is included in Layer 1 of the stack and VF driver 252C is included in Layer 2 of the stack. In another instance, VF 220E may be a supervisory function to VF 220F, as VF driver 244B is included in Layer 1 of the stack and VF driver 252D is included in Layer 2 of the stack.

In one or more embodiments, a supervisory function may be a virtual function allocated to a physical function. In one example, the supervisory function may include one or more privileges that may be utilized in controlling of one or more child virtual functions. In one instance, VF 220B may include one or more privileges that may be utilized in controlling of one or more child VFs 220A and 220C. In another instance, VF 220E may include one or more privileges that may be utilized in controlling of one or more child VFs 220D and 220F. In another example, the supervisory function may include a virtual function with modified base address registers (BARs) that include a pool of mapped registers that may be utilized in controlling one or more child virtual functions.

In one or more embodiments, a supervisory function may appear as a physical function to any descendant virtual function of the supervisory function. In one example, utilizing a supervisory function may provide one or more advantages over a peripheral component interconnect (PCI) pass-through. For instance, the supervisory function may permit and/or deny one or more actions and/or configurations of a descendant virtual function. In a second example, functionality of a physical function may be implemented and/or controlled by a nested hypervisor. For instance, the functionality of the physical function may be implemented and/or controlled by the nested hypervisor rather than a bare-metal hypervisor. In a third example, utilizing functionality of a physical function that is implemented and/or controlled by a nested hypervisor may provide SR-IOV on-top-of SR-IOV functionality. In another example, utilizing functionality of a physical function that is implemented and/or controlled by a nested hypervisor may provide virtual multipath input/output (MPIO). For instance, two virtual functions may implement respective two physical functions (e.g., respective two virtual physical functions), and the two virtual functions, implementing the respective two physical functions, may be utilized in providing virtual MPIO.

In one or more embodiments, a supervisory virtual function may have control over one or more actions of one or more child virtual functions of the supervisory virtual function, one or more actions of one or more grandchild virtual functions of the supervisory virtual function, one or more actions of one or more great-grandchild virtual functions of the supervisory virtual function, etc. For example, the supervisory virtual function controlling one or more actions of a descendent virtual function may aid in providing one or more security domains utilizing VMs and/or containers (e.g., OS-level virtualization instances). For instance, only the supervisory virtual function may control the one or more actions of the descendent virtual function.

Although FIG. 2B illustrates a single parent-child relationship, multiple parent-child relationships may be implemented in a recursive and/or nested fashion, according to one or more embodiments. For example, a first virtual function may be a parent of a second virtual function, and the second virtual function may be a parent to a third virtual function. For instance, the third virtual function may be a child of the second virtual function, and the second virtual function may be a child of the first virtual function.

In one or more embodiments, the parent-child relationships may correspond to a nesting of hypervisors and/or virtual machines. In one example, the first virtual function may be associated with a first hypervisor, and the second virtual function may be associated with a second hypervisor, where the second hypervisor may be nested within the first hypervisor. In a second example, the third virtual function may be associated with a third hypervisor, where the third hypervisor may be nested within the second hypervisor. In another example, a fourth virtual function may be associated with VM of the third hypervisor. For instance, the third virtual function may be a parent of the fourth virtual function.

In one or more embodiments, a virtual function, that may have a parent virtual function and a child virtual function, may proxy one or more requests and/or responses between the parent virtual function and the child virtual function. In one example, the second virtual function may proxy one or more requests and/or responses between the first virtual function and the third virtual function. In another example, the third virtual function may proxy one or more requests and/or responses between the second virtual function and the fourth virtual function.

In one or more embodiments, a VF driver may be enhanced to provide one or more capabilities of a PF driver. In one example, the VF driver may include one or more attributes. For instance, an attribute of the VF driver may include a number of virtual functions, and when the number of virtual functions becomes non-zero, the VF driver may provide a request to a PF driver (of Layer 0) to allocate the number of virtual functions, which may commission and/or appoint the virtual function corresponding to the VF driver that provided the request a supervisory virtual function to the allocated number of virtual functions.

In another example, an emulated input/output memory management unit (IOMMU) may be coordinated with a hypervisor of Layer 0. For instance, the hypervisor of Layer 0 may be configured to perform a PCI pass-through and/or configured to perform one or more address translations. In one or more embodiments, configuring the hypervisor of Layer 0 to perform the PCI pass-through and/or to perform the one or more address translations may enable the one or more the newly allocated virtual functions to be child virtual functions of the virtual function corresponding to the VF driver that provided the request.

Figure 3:
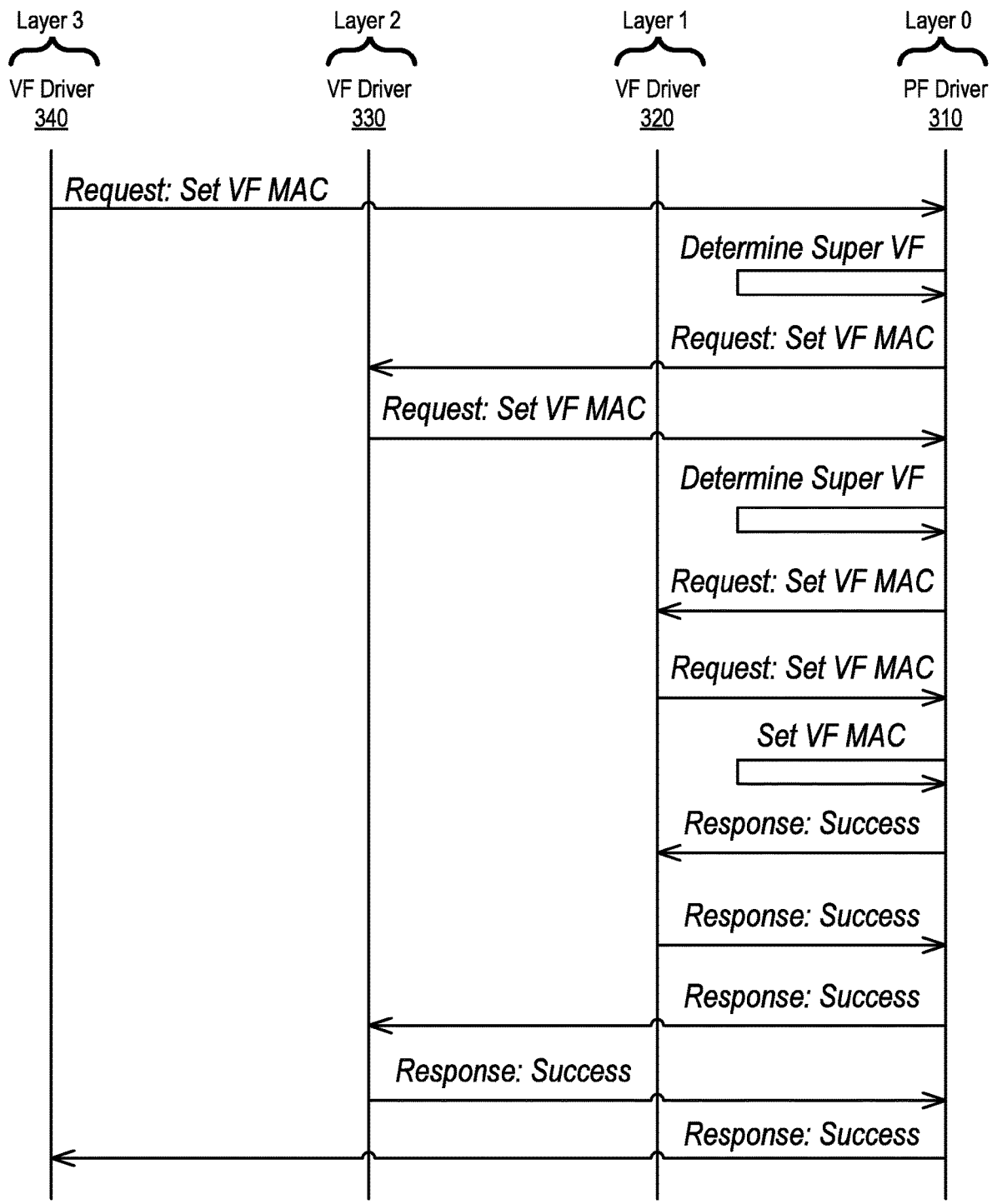
FIG. 3 illustrates an exemplary sequence diagram of media access control address set request and response, according to one or more embodiments.

Turning now to FIG. 3, an exemplary sequence diagram of media access control address set request and response is illustrated, according to one or more embodiments. As shown, a VF driver 340 may issue a request to a PF driver 310. For example, the request may include a request to set a VF media access control (MAC) address. In one or more embodiments, VF driver 340 may not have information associated with a supervisory VF, and VF driver 340 may issue the request to PF driver 310. For example, PF driver 310 may route requests and/or responses associated with VF drivers within a hierarchy of VF drivers.

As illustrated, PF driver 310 may determine a supervisory (super) VF for a VF corresponding to VF driver 340. For example, determining the super VF for the VF corresponding to VF driver 340 may include determining the super VF for the VF corresponding to VF driver 340 via a lookup table. For instance, PF driver 310 may lookup a super VF for the VF corresponding to VF driver 340.

As shown, PF driver 310 may issue the request to a VF driver 330. For example, a VF driver may be at a Nth level, and PF driver 310 may issue the request to a VF driver at a N−1 level. For instance, N may be three (3), and PF driver 310 may issue the request to VF driver 330 at a N−1 level (two (2)). In one or more embodiments, if a virtual function does not have a parent virtual function, the request may be issued to a physical function driver.

As illustrated, VF driver 330 may issue the request to PF driver 310. For example, a virtual function corresponding to VF driver 330 may be associated with a parent virtual function of a virtual function corresponding to VF driver 340, and the virtual function corresponding to VF driver 330 may proxy the request on behalf of the virtual function corresponding to VF driver 340. As shown, PF 310 may determine a super VF for a VF corresponding to VF driver 330. For example, determining the super VF for the VF corresponding to VF driver 330 may include determining the super VF for the VF corresponding to VF driver 330 via a lookup table. For instance, PF driver 310 may lookup a super VF for the VF corresponding to VF driver 330.

As illustrated, PF driver 310 may issue the request to a VF driver 320. As shown, VF driver 320 may issue the request to PF driver 310. For example, VF driver 320 may proxy the request. As shown, PF driver 310 may implement and/or perform the request. For example, PF driver 310 may set the MAC address for the virtual function corresponding to VF driver 340. As illustrated, PF driver 310 may issue a response to VF driver 320. For example, the response may include information indicating that the request was granted and/or was a success. As shown, VF driver 320 may issue the response to PF driver 310. For example, VF driver 320 may proxy the response. As shown, PF driver 310 may issue a response to VF driver 330. As shown, VF driver 330 may issue the response to PF driver 310. For example, VF driver 330 may proxy the response. As illustrated, PF driver 310 may issue the response to VF driver 340.

In one or more embodiments, any virtual function corresponding to a VF driver in a hierarchy of hypervisors and/or in the hierarchy of VF drivers may deny the request. For example, virtual function of Layer 1 or Layer 2 may deny the request. In one or more embodiments, a physical function may deny the request. For example, the PF corresponding to PF driver 310 may deny the request.

Figure 4:
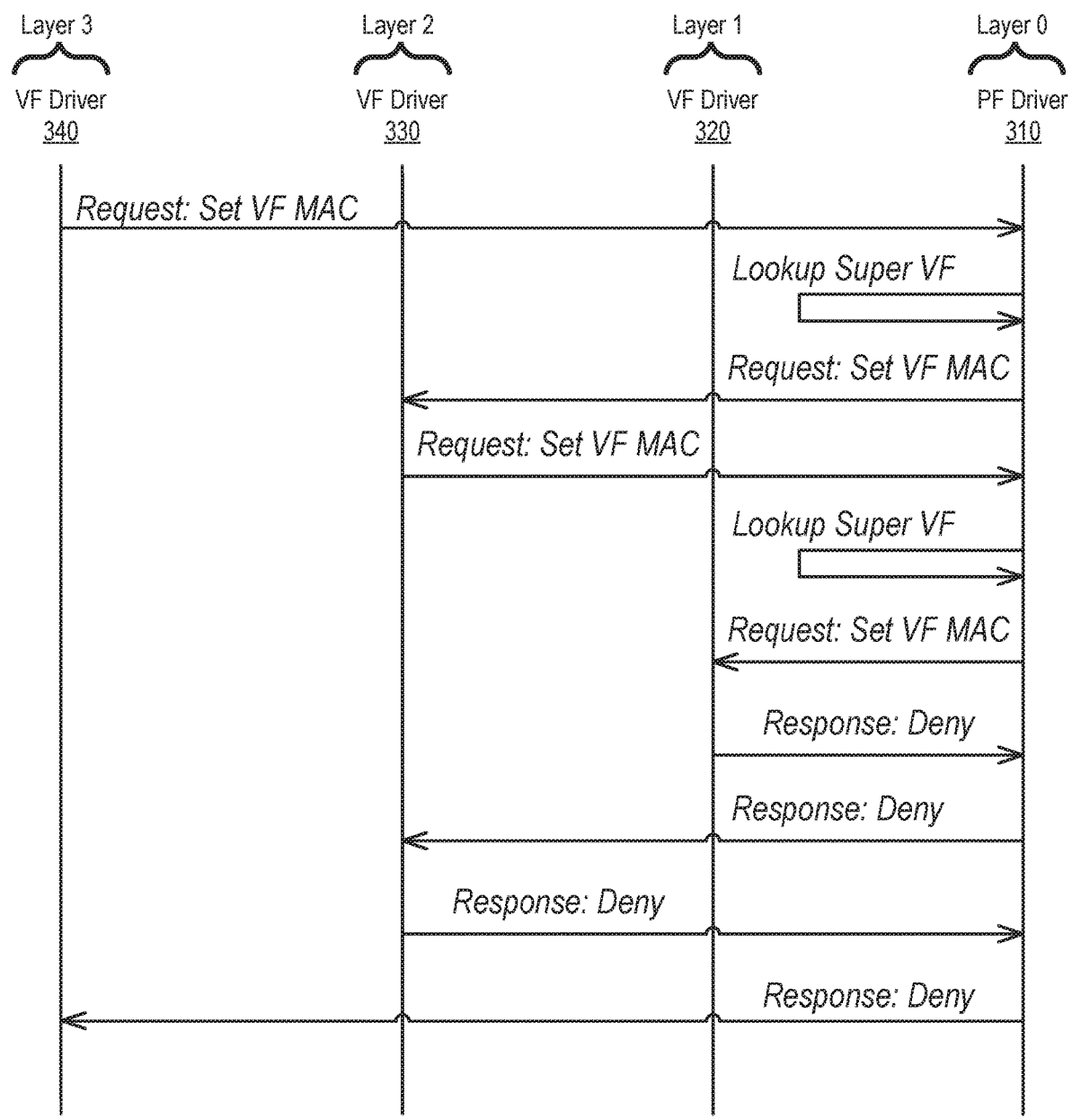
FIG. 4 illustrates an exemplary sequence diagram of media access control address set request and a denied response, according to one or more embodiments.

Turning now to FIG. 4, an exemplary sequence diagram of media access control address set request and a denied response is illustrated, according to one or more embodiments. As shown, a first portion of a sequence illustrated in FIG. 4 may correspond to a first portion of the sequence illustrated in FIG. 3 up to PF driver 310 issuing the request to VF driver 320. In one or more embodiments, the request may be denied. For example, the virtual function corresponding to VF driver 320 may deny the request. For instance, the virtual function corresponding to VF driver 320 may be a grandparent of the virtual function corresponding to VF driver 340.

In one or more embodiments, the virtual function corresponding to VF driver 320 may include one or more rules that may be satisfied such that the request may not be denied by VF driver 320. For example, the request may not satisfy each of the one or more rules and VF driver 320 may deny the request. In one or more embodiments, the virtual function corresponding to VF driver 320 may include one or more rules that may be satisfied such that the request may be denied by VF driver 320. In one example, the request may not satisfy each of the one or more rules that may deny the request, and VF driver 320 may not deny the request. For instance, the request may not satisfy any of the one or more rules, and VF driver 320 may not deny the request. In one or more embodiments, utilizing rules may permit one or more lower layers to place one or more limitations on one or more upper layers.

As illustrated, VF driver 320 may issue a response to PF driver 310. For example, the response may include information indicating that the request was denied and/or was a not success. As shown, PF driver 310 may issue the response to VF driver 330. As illustrated, VF driver 330 may issue the response to PF driver 310. For example, VF driver 330 may proxy the response. As shown, PF driver 310 may issue the response to VF driver 340.

As illustrated in FIGS. 3 and 4, a physical function driver may receive a request, issued from a virtual function driver at a Nth level of nesting of a hierarchy of nested virtual function drivers, each of the hierarchy of nested virtual function drivers corresponding to a respective virtual machine in a hierarchy of virtual machines, according to one or more embodiments. As shown, until a response to the request is provided, the physical function driver may provide the request to a virtual function driver at a next lower level of the hierarchy of nested virtual functions, in one example. As illustrated, until the response is provided to the virtual function driver at the Nth level of nesting of the hierarchy of nested virtual function drivers, the physical function driver may provide the response to a virtual function driver at a next upper level of the hierarchy of nested virtual function drivers, beginning with a virtual function driver immediately above the physical function, in another example.

Turning now to FIG. 5, an exemplary block diagram of registers is illustrated, according to one or more embodiments. As shown, physical function configuration space registers 510 may include an alternative routing-ID interpretation (ARI) register, a supported page size register, a global status register, and a link control register. In one or more embodiments, the ARI register may be utilized as a bus and function. As illustrated, supervisory function configuration space registers 520 may include an allocated virtual function range.

In one or more embodiments, each of one or more supervisory functions may include configuration space registers such as supervisory function configuration space registers 520. For example, supervisory function configuration space registers 520 may permit designation, commission, and/or appointment of one or more virtual functions within a hierarchy to a supervisory function. In one instance, supervisory function configuration space registers 520 may be pooled, permitting a number of supervisory functions, and the pooled supervisory function configuration space registers 520 may be dynamically assigned by the physical function driver to upgrade a virtual function to a supervisory function. In another example, supervisory function configuration space registers 520 may be utilized in allocating a first number of virtual functions to a first supervisory function and in allocating a second number, different from the first number, of virtual functions to a second supervisory function, different from the first supervisory function. As shown, virtual function configuration space registers 530 may include a MAC address register and BARs. In one or more embodiments, each of one or more virtual functions may include configuration space registers such as virtual function configuration space registers 530.

Figure 6A:
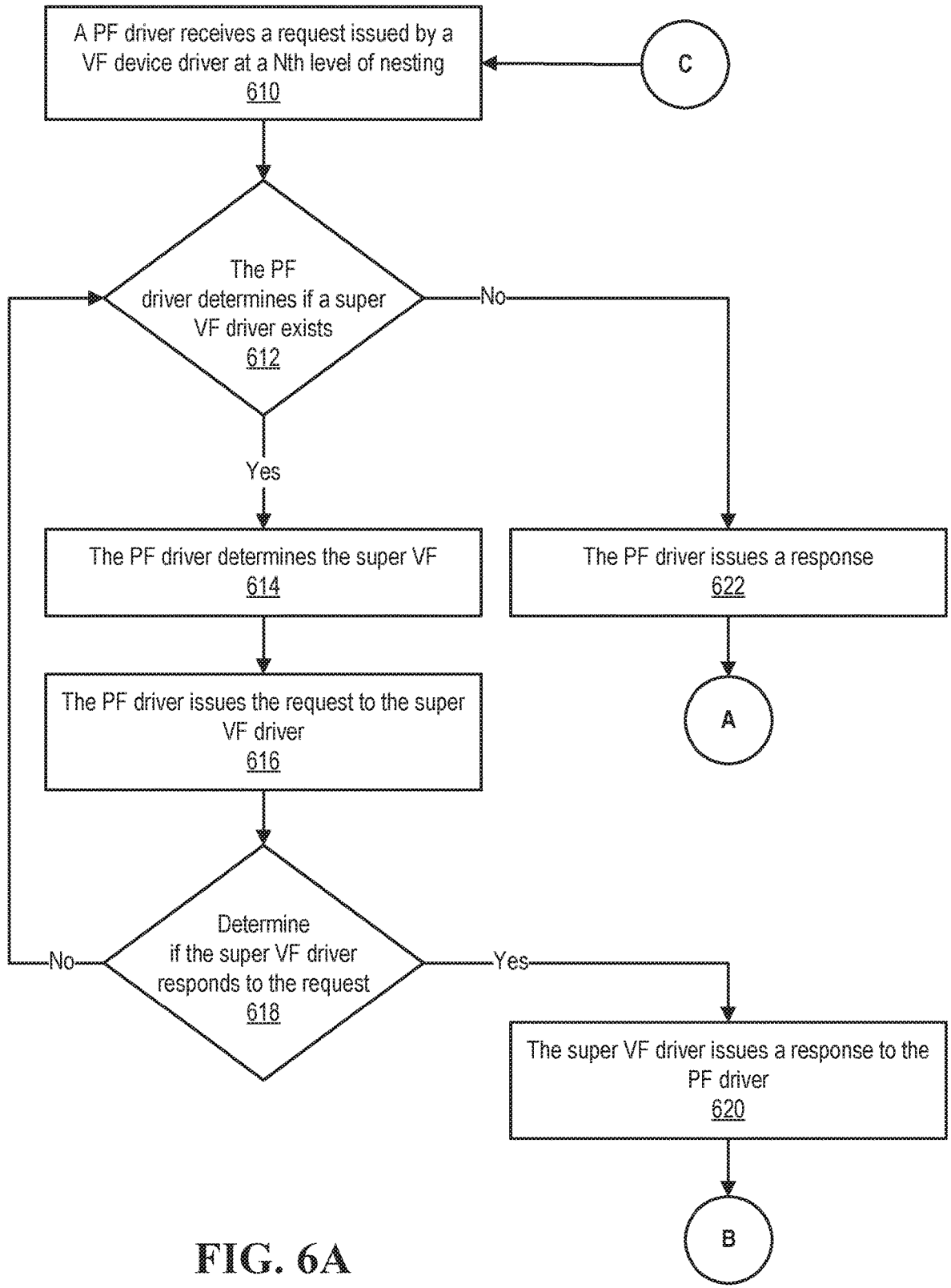
FIGS. 6A and 6B illustrate a method of utilizing virtual functions in a nested arrangement, according to one or more embodiments.
Figure 6B:
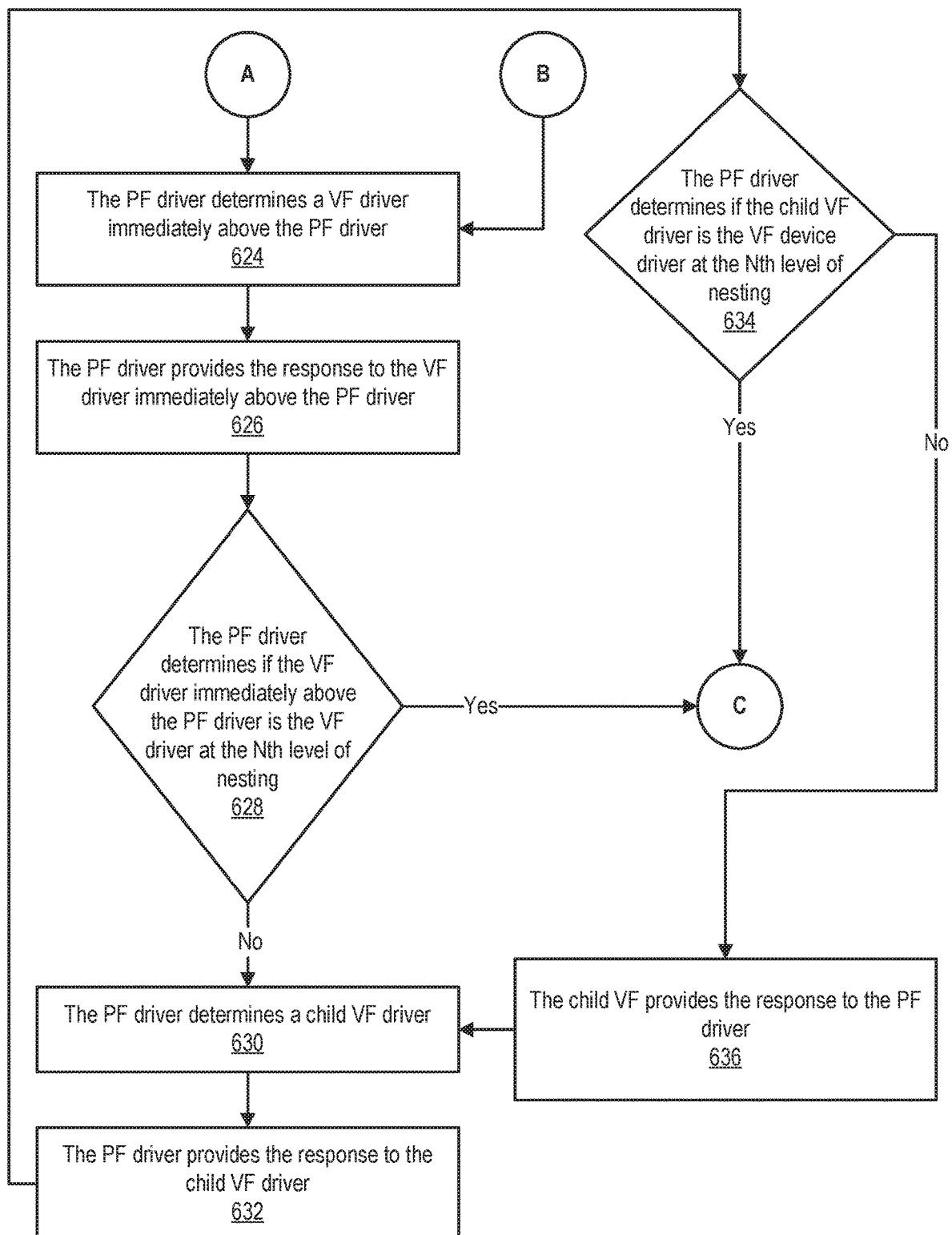

Turning now to FIGS. 6A and 6B, a method of utilizing virtual functions in a nested arrangement is illustrated, according to one or more embodiments. At 610, a PF driver may receive a request issued by a VF driver at a Nth level of nesting. At 612, the PF driver may determine if a super VF driver exists. For example, the PF driver may determine if a super VF driver exists for a current PF driver at a current level of nesting. If a super VF driver exists, the PF driver may determine the super VF, at 614. At 616, the PF driver may issue the request to the super VF.

At 618, it may be determined if the super VF driver responds to the request. If the super VF does not respond to the request, the method may proceed to 612. If the super VF driver does respond to the request, the super VF may issue a response to the PF driver at 620, and the method may proceed to 624. If the PF driver determines that a super VF driver does not exist, the PF driver may issue a response at 622.

At 624, the PF driver may determine a VF driver immediately above the PF driver in the nested arrangement. At 626, the PF driver provides the response to the VF driver immediately above the PF driver. At 628, the PF driver may determine if the VF driver immediately above the PF driver is the VF driver at the Nth level of nesting. If the VF driver immediately above the PF driver is the VF driver at the Nth level of nesting, the method may proceed to 610. If the VF driver immediately above the PF driver is not the VF driver at the Nth level of nesting, the PF driver may determine a child VF driver at 630.

At 632, the PF driver may provide the response to the child VF driver. At 634, the PF driver may determine if the child VF driver is the VF driver at the Nth level of nesting. If the child VF driver is the VF driver at the Nth level of nesting, the method may proceed to 610. If the child VF driver is not the VF driver at the Nth level of nesting, the child VF may provide the response to the PF driver at 636, and the method may proceed to 630.

Figure 7:
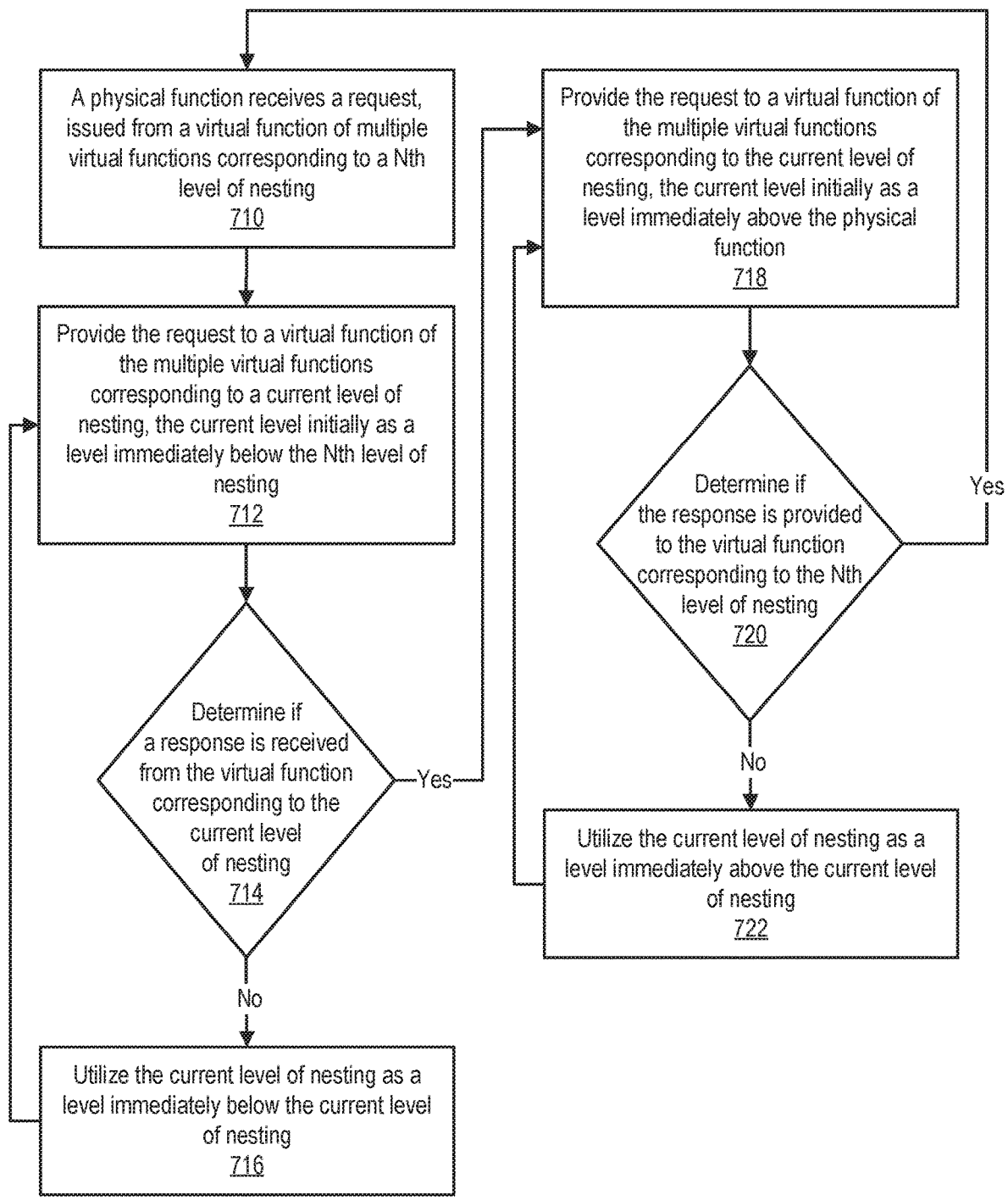
FIG. 7 illustrates a method of utilizing a device, according to one or more embodiments.

Turning now to FIG. 7, a method of utilizing a device is illustrated, according to one or more embodiments. At 710, a physical function may receive a request issued from a virtual function of multiple of virtual functions corresponding to a Nth level of nesting of the multiple virtual functions. For example, PF 222 may receive a request issued from a virtual function of virtual functions 220 corresponding to a Nth level of nesting of the multiple virtual functions. In one instance, virtual functions 220 may be operable to be arranged in and/or configured into a logical nested hierarchy. In another instance, virtual functions 220 may be operable to be configured to respective virtual machines in a hierarchy of nested virtual machines.

At 712, the physical function may provide the request to a virtual function of the multiple virtual functions corresponding to a current level of nesting, the current level initially as a level immediately below the Nth level of nesting. At 714, it may be determined if a response is received from the virtual function corresponding to the current level of nesting. If the response is not received from the virtual function corresponding to the current level of nesting, a level immediately below the current level of nesting may be utilized at 716, and the method may proceed to 712. If the response is received from the virtual function corresponding to the current level of nesting, the physical function may provide the response to a virtual function of the multiple virtual functions corresponding to the current level of nesting, the current level initially as a level immediately above the physical function, at 718.

At 720, it may be determined if the response is provided to the virtual function corresponding to the Nth level of nesting. If the response is not provided to the virtual function corresponding to the Nth level of nesting, a level immediately above the current level of nesting may be utilized as the current level of nesting, at 722. If the response is provided to the virtual function corresponding to the Nth level of nesting, the method may proceed to 710, according to one or more embodiments.

Figure 8:
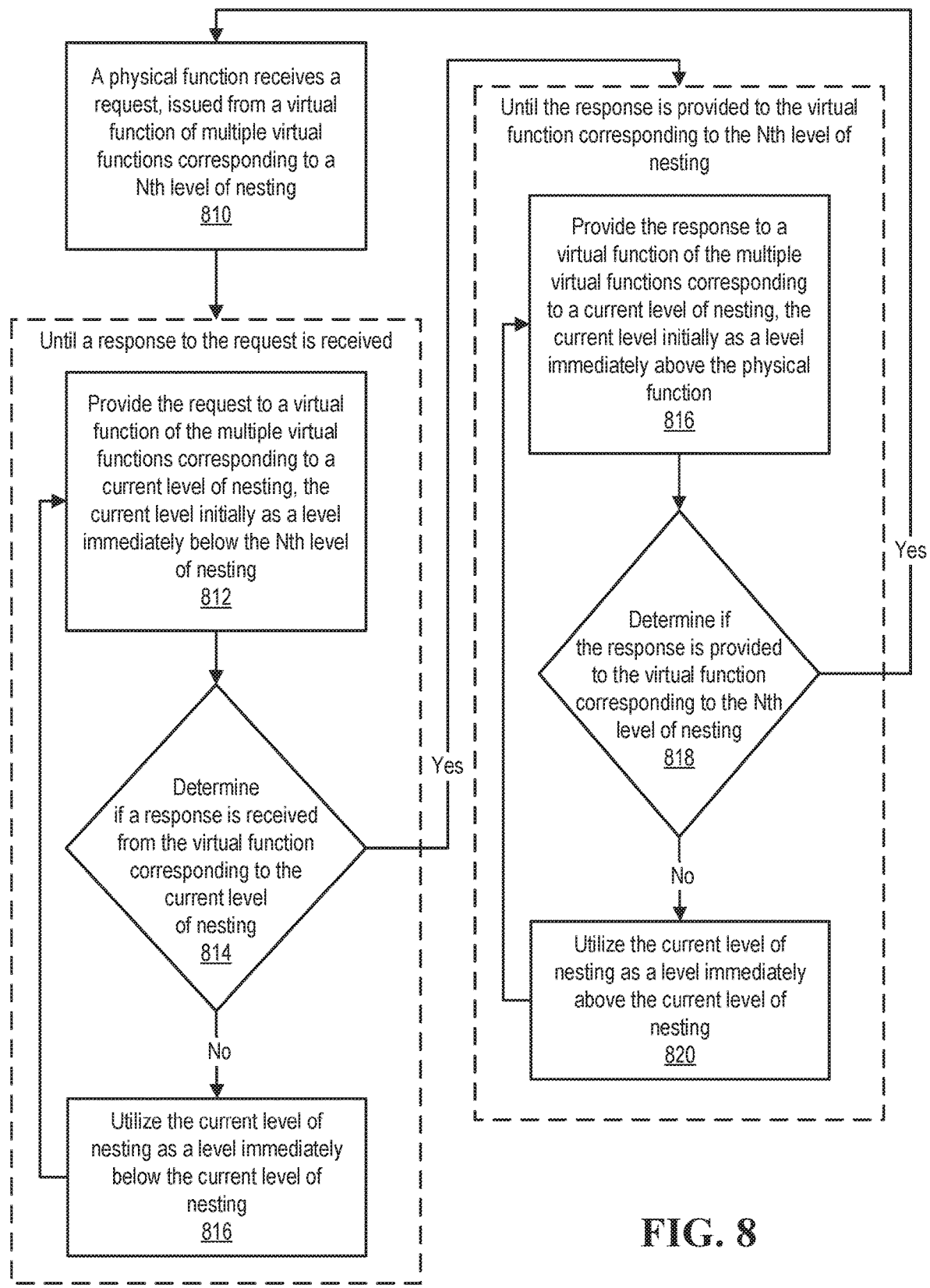
FIG. 8 illustrates a method of utilizing a device, according to one or more embodiments.

Turning now to FIG. 8, another method of utilizing a device is illustrated, according to one or more embodiments. At 810, a physical function may receive a request issued from a virtual function of multiple of virtual functions corresponding to a Nth level of nesting of the multiple virtual functions. For example, PF 222 may receive a request issued from a virtual function of virtual functions 220 corresponding to a Nth level of nesting of the multiple virtual functions. In one instance, virtual functions 220 may be operable to be arranged in and/or configured into a logical nested hierarchy. In another instance, virtual functions 220 may be operable to be configured to respective virtual machines in a hierarchy of nested virtual machines. In one or more embodiments, until a response to the request is received, method elements 812-816 may be iteratively performed.

At 812, the physical function may provide the request to a virtual function of the multiple virtual functions corresponding to a current level of nesting, the current level initially as a level immediately below the Nth level of nesting. At 814, it may be determined if the response is received from the virtual function corresponding to the current level of nesting. If the response is not received from the virtual function corresponding to the current level of nesting, a level immediately below the current level of nesting may be utilized, at 816, and the method may proceed to 812.

If the response is received from the virtual function corresponding to the current level of nesting, method elements 816-820 may be iteratively performed, according to one or more embodiments. At 816, the physical function may provide the response to a virtual function of the multiple virtual functions corresponding to the current level of nesting, the current level initially as a level immediately above the physical function. At 818, it may be determined if the response is provided to the virtual function corresponding to the Nth level of nesting. If the response is not provided to the virtual function corresponding to the Nth level of nesting, a level immediately above the current level of nesting may be utilized as the current level of nesting, at 820, and the method may proceed to 816, according to one or more embodiments. If the response is provided to the virtual function corresponding to the Nth level of nesting, the method may proceed to 810, according to one or more embodiments.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device, comprising a physical processor executing a physical function and a plurality of virtual machines arranged in a hierarchy of nested virtual machines, wherein the plurality of virtual machines execute respective virtual functions that are arranged in a logical nested hierarchy of virtual functions, the logical nested hierarchy comprising at least a first and a second branch, the first and second branches each having a plurality of levels of virtual functions, wherein the first branch comprises a first number of virtual functions and the second branch comprises a second number of different virtual functions, the second number different than the first number;
wherein the physical function is configured to:
allocate the first number of virtual functions of the plurality of virtual functions in the first branch to a first supervisory virtual function, the first supervisory virtual function being a root virtual function of the first branch, and wherein the first supervisory virtual function is enabled to grant or deny requests for the first number of virtual functions to process information;
allocate the second number of virtual functions of the plurality of virtual functions in the second branch to a second supervisory virtual function, the second supervisory virtual function being a root virtual function of the second branch, wherein the second supervisory virtual function differs from the first supervisory virtual function, and wherein the second supervisory virtual function is enabled to grant or deny requests for the second number of virtual functions to process information;
receive, from a particular virtual function at a particular level of the logical nested hierarchy, a request to process information using a target virtual function in a lower level of the logical nested hierarchy, wherein the target virtual function is a descendent of the particular virtual function in the logical nested hierarchy;
in response to the request, and based on a determination that the particular virtual function is one of the second number of virtual functions, identifying the second supervisory virtual function as a supervisory virtual function of the particular virtual function;
in response to identifying the second supervisory virtual function as the supervisory virtual function for the particular virtual function, and until a response to the request is received by the physical function from the target virtual function, and given an initial current level of nesting immediately below the particular level of the logical nested hierarchy, iteratively:
providing, by the physical function, the request to each virtual function at the current level of nesting and, denying, by the second supervisory virtual function, the request until the request is provided to the target virtual function;
when the request has been denied for each virtual function at the current level of nesting, setting by the physical function, a level in the logical nested hierarchy immediately below the current level of nesting as the current level of nesting; and
when the request is provided to the target virtual function, granting, by the second supervisory virtual function, the request, and returning a response to the physical function, wherein the response is generated by processing the information by the target virtual function;
after the response to the request is received by the physical function, the physical function setting a level immediately above the current level of nesting as the current level of nesting, and until the response is provided by the physical function to the particular virtual function, iteratively:
providing, by the physical function, the response to each virtual function at the current level of nesting and
by the physical function, a level immediately above the current level of nesting as the current level of nesting until the response is provided to the particular virtual function at the particular level of the logical nested hierarchy.

2. The device of claim 1, wherein the device includes a single-root input/output virtualization (SR-IOV) device.

3. The device of claim 1, wherein the device includes a network adapter, a storage adapter, and a graphics processing unit (GPU) device.

4. The device of claim 1, wherein the request includes a request to set a media access control (MAC) address of a particular virtual machine.

5. The device of claim 1, wherein each network partition of a plurality of network partitions respectively includes each virtual function of the plurality of virtual functions.

6. A method performed by a device comprising a physical processor executing a physical function and a plurality of virtual machines arranged in a hierarchy of nested virtual machines, wherein the plurality of virtual machines execute respective virtual functions that are arranged in a logical nested hierarchy of virtual functions, the logical nested hierarchy comprising at least a first and a second branch, the first and second branches each having a plurality of levels of virtual functions, wherein the first branch comprises a first number of virtual functions and the second branch comprises a second number of different virtual functions, the second number different than the first number, the method comprising:
allocating, by the physical function, the first number of virtual functions in the first branch to a first supervisory virtual function the first supervisory virtual function being a root of the first branch, and wherein the first supervisory virtual function is enabled to grant or deny requests for the first number of virtual functions to process information;
allocating, by the physical function, the second number of virtual functions of a plurality of virtual functions in the second branch to a second supervisory virtual function, the second supervisory virtual function being a root virtual function of the second branch, wherein the second supervisory virtual function differs from the first supervisory virtual function, and wherein the second supervisory virtual function is enabled to grant or deny requests for the second number of virtual functions to process information;
in response to receiving a request from a particular virtual function at a particular level of the logical nested hierarchy to process information using a target virtual function in a lower level of the logical nested hierarchy, wherein the target virtual function is a descendent of the particular virtual function in the logical nested hierarchy, identifying the second supervisory virtual function as a supervisory virtual function of the particular virtual function based on a determination that the particular virtual function is one of the second number of virtual functions;
in response to identifying the second supervisory function as the supervisory virtual function for the particular virtual function, and until a response to the request is received, by the physical function from the target virtual function, and given an initial current level of nesting immediately below the particular level of the logical nested hierarchy, iteratively:
providing, by the physical function, the request to each virtual function at the current level of nesting and denying, by the second supervisory virtual function, the request until the request is provided to the target virtual function;
when the second supervisory virtual function denies the request for each virtual function at the current level of nesting, setting, by the physical function, a level in the logical nested hierarchy immediately below the current level of nesting as the current level of nesting; and
when the request is provided to the target virtual function, granting, by the second supervisory virtual function, the request, and returning a response to the physical function, wherein the response is generated by processing the information by the target virtual function;
after the response to the request is received by the physical function, the physical function setting a level immediately above the current level of nesting as the current level of nesting, and until the response is provided by the physical function to the particular virtual function, iteratively:
providing, by the physical function, the response to each virtual function at the current level of nesting; and
setting, by the physical function, a level immediately above the current level of nesting as the current level of nesting until the response is provided to the particular virtual function at the particular level of the logical nested hierarchy.

7. The method of claim 6, wherein the device includes a single-root input/output virtualization (SR-IOV) device.

8. The method of claim 6, wherein the device includes a network adapter, a storage adapter, and a graphics processing unit (GPU) device.

9. The method of claim 6, wherein the request includes a request to set a media access control (MAC) address of a particular virtual machine.

10. The method of claim 6, wherein each network partition of a plurality of network partitions respectively includes each virtual function of the plurality of virtual functions.

11. A system, comprising:
a processor;
a memory medium that is communicatively coupled to the processor and that includes instructions executable by the processor; and
a device that is coupled to the processor comprising a physical processor executing a physical function and a plurality of virtual machines arranged in a hierarchy of nested virtual machines, wherein the plurality of virtual machines execute respective virtual functions that are arranged in a logical nested hierarchy of virtual functions, the logical nested hierarchy comprising at least a first and a second branch, the first and second branches each having a plurality of levels of virtual functions, wherein the first branch comprises a first number of virtual functions and the second branch comprises a second number of different virtual functions, the second number different than the first number; and
wherein the physical function that is executed by the processor is configured to:
 allocate the first number of virtual functions of the plurality of virtual functions to a first supervisory virtual function, the first supervisory virtual function being a root virtual function of the first branch, and wherein the first supervisory virtual function is enabled to grant or deny requests for the first number of virtual functions to process information;
 allocate the second number of virtual functions of the plurality of virtual functions to a second supervisory virtual function, the second supervisory virtual function being a root virtual function of the second branch, wherein the second supervisory function differs from the first supervisory virtual function, and wherein the second supervisory virtual function is enabled to grant or deny requests for the second number of virtual functions to process information;
 receive, from a particular virtual function at a articular level of the logical nested hierarchy, a request to process information using a target virtual function in a lower level of the logical nested hierarchy, wherein the target virtual function is a descendent of the particular virtual function in the logical nested hierarchy;
 in response to the request, and based on a determination that the particular virtual function is one of the second number of virtual functions, identifying the second supervisory virtual function as a supervisory virtual function of the particular virtual function;
 in response to identifying the second supervisory virtual function as the supervisory virtual function for the particular virtual function, and until a response to the request is received by the physical function from the target virtual function, and given an initial current level of nesting immediately below the particular level of the logical nested hierarchy, iteratively:
  providing, by the physical function, the request to each virtual function at the current level of nesting and, denying, by the second supervisory virtual function, the request until the request is provided to the target virtual function;
  when the request has been denied for each virtual function at the current level of nesting, setting by the physical function, a level in the logical nested hierarchy immediately below the current level of nesting as the current level of nesting; and
  when the request is provided to the target virtual function, granting, by the second supervisory virtual function, the request, and returning a response to the physical function, wherein the response is generated by processing the information by the target virtual function;
 after the response to the request is received by the physical function, the physical function setting a level immediately above the current level of nesting as the current level of nesting, and until the response is provided by the physical function to the particular virtual function, iteratively:
  providing, by the physical function, the response to each virtual function at the current level of nesting and
  setting, by the physical function, a level immediately above the current level of nesting as the current level of nesting until the response is provided to the particular virtual function at the particular level of the logical nested hierarchy.

12. The system of claim 11, wherein the device includes a single-root input/output virtualization (SR-IOV) device.

* * * * *